United States Patent [19]
Yoshimura et al.

[11] Patent Number: 5,405,712
[45] Date of Patent: Apr. 11, 1995

[54] SOLID OXIDE FUEL CELL GENERATOR

[75] Inventors: Takayoshi Yoshimura, Kurobe; Masaki Sato, Funabashi; Toshio Arai, Toyama, all of Japan

[73] Assignee: YKK Corporation, Tokyo, Japan

[21] Appl. No.: 97,373

[22] Filed: Jul. 27, 1993

[30] Foreign Application Priority Data

Aug. 13, 1992 [JP] Japan .................................. 4-216099

[51] Int. Cl.6 ............................................. H01M 8/10
[52] U.S. Cl. .................................... 429/38; 429/32; 429/34; 429/35; 429/36
[58] Field of Search ................. 429/38, 36, 35, 34, 429/32

[56] References Cited

U.S. PATENT DOCUMENTS

| 5,171,646 | 12/1992 | Rohr | 429/34 |
| 5,185,219 | 2/1993 | Ishihara et al. | 429/31 |
| 5,252,409 | 10/1993 | Akagi | 429/32 |

Primary Examiner—Prince Willis, Jr.
Assistant Examiner—M. Nuzzolillo
Attorney, Agent, or Firm—Finnegan, Henderson, Farabow, Garrett & Dunner

[57] ABSTRACT

A solid oxide fuel cell generator comprising: a plurality of cell mounting holes formed on the surface of a hollow dense substrate and having supports therein; and cell sections provided on recesses formed by the mounting holes and the supports, with adjacent cell sections being connected to each other by electrically conductive interconnections, in which a hollow longitudinal supply channel for supplying a fuel or fuel assistant gas is provided adjacent to the cell mounting holes in the substrate, the supply channel being kept at its other end in communication with a hollow section of the substrate inside the cell sections. The supply channel is preferably provided on both lateral sides of the substrate. The solid oxide fuel cell generator has a high areal efficiency of the cell generating part with respect to a substrate and a superior generating efficiency.

2 Claims, 13 Drawing Sheets

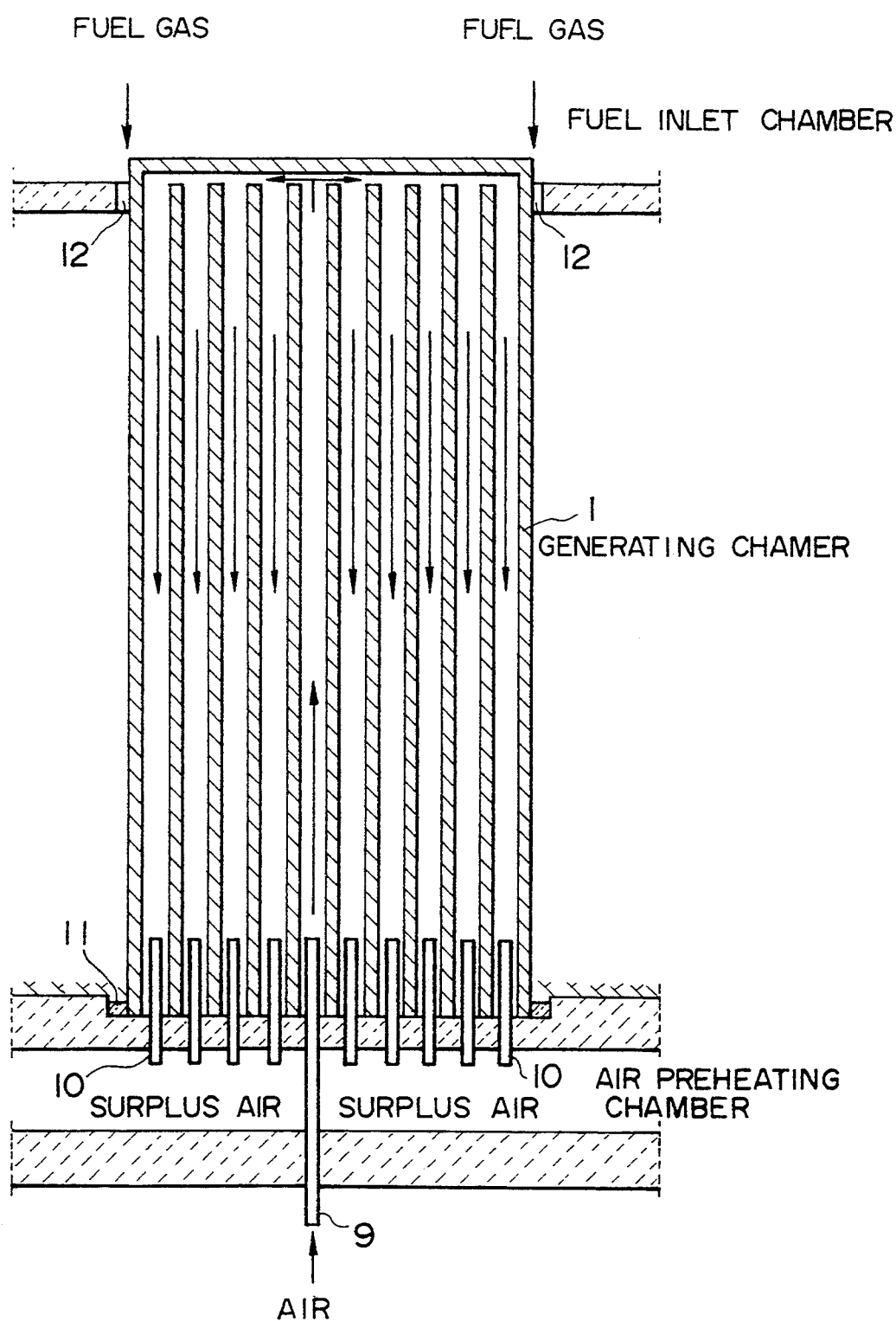

SOLID OXIDE FUEL CELL GENERATOR

BACKGROUND OF THE INVENTION

1. Field of the Invention

This invention relates to a generator using solid oxide fuel cells. More particularly, it relates to a generator capable of efficiently preheating a fuel or fuel assistant gas.

2. Description of the Prior Art

A solid oxide fuel cell (hereinafter referred to as a SOFC) is operated at a temperature of the order of 1000° C. Therefore, it is necessary to provide means for supplying a fuel or a fuel assistant gas into and means for discharging an unreacted or reacted gas out of a generating chamber.

Consequently, with an arrangement in which the substrate is combined a gas inlet part and a gas outlet part together with a cell mounting part, the cell section or the power generating section can be provided only at a mid portion of the substrate, thus leading to a poor areal efficiency with respect to the substrate and to an increased size of the structural unit. Besides, since the gas at a temperature of the order of room temperature is directly supplied to the cell section, the cell section tends to be cooled to lower the generating efficiency. The problem may considerably arise especially at a section where a fuel assistant gas, such as air, is supplied.

SUMMARY OF THE INVENTION

It is an object of the present invention to provide a fuel cell generator in which the areal efficiency with respect to the substrate is improved, and in which the generating efficiency is also improved by sufficient gas preheating.

According to the present invention, there is provided a solid oxide fuel cell generator comprising: a plurality of fuel cell mounting holes formed on the surface of a hollow dense substrate and having supports therein; and cell sections provided on recesses formed by the mounting holes and the supports, with adjacent cell sections being connected to each other by electrically conductive interconnections, in which a hollow longitudinal supply channel for supplying a fuel or fuel assistant gas is provided adjacent to the cell mounting holes in the substrate, the supply channel being kept at its other end in communication with hollow section of the substrate inside the cell sections. The supply channels is preferably provided on both lateral sides of the substrate.

BRIEF DESCRIPTION OF THE DRAWINGS

FIG. 13 is a sectional view of a further substrate modified from that shown in FIG. 12.

DETAILED DESCRIPTION OF THE PREFERRED EMBODIMENTS

More specifically, in contradistinction to the conventional generator in which both ends of a hollow section of a dense substrate, serving as a gas passage, are opened to permit a unidirectional gas flow, the solid oxide fuel cell generator of the present invention has hollow parts which are formed in the substrate, without contacting with cell sections, and are used as gas supply channels for a fuel or fuel assistant gas. The channels communicate, at their one end, with other hollow parts of the substrate on which cell sections are mounted. In this manner, the preheating and non-generating substrate areas provided in the conventional generator for preheating and introducing the gas to the inside of the substrate may be reduced and the substrate length is also reduced for the same generating area. Consequently, the size of the modular unit(stack) can be reduced.

In a preferred embodiment, the supply channel is provided on both lateral sides of the substrate. This not only obviates the problem of cooling of the generating section and the resultant lowering of the generating efficiency but also renders it unnecessary to use special components, such as preheating tubes. Also, in such a structure, both lateral sides of the substrate, which has heretofore been a dead zone (i.e., a zone free of the cell sections) for maintaining the integrity of a dense substrate, can be used as supply channels, thereby enhancing especially the areal efficiency while maintaining the integrity of the dense substrate.

In addition, since the substrate of the present invention is formed of a dense structure, it is unnecessary to cover the substrate portions other than the cell sections with a special gas seal film as opposed to the conventional system in which the cell sections are mounted onto a porous substrate and portions other than the cell sections are required to be covered with a special gas seal film. Therefore, in the present invention, the hollow part of the substrate may be used freely for gas preheating or the like. Furthermore, as one end of the substrate is closed in advance, gas sealing treatment between the substrate and a support element supporting the substrate in a chamber is required only at the lower end of the substrate as opposed to the conventional system in which the substrate is fixed and hermetically sealed at the both ends of the substrate. Consequently, the substrate is not applied thermal stress even when the geometrical difference between the substrate and its support element occurs due to the difference of thermal expansion coefficient, and the problems of destruction of fixed part of the substrate and gas leakage at that part are solved drastically.

The present invention will be explained in more detail with reference to the following Examples.

EXAMPLES

Figure 6:
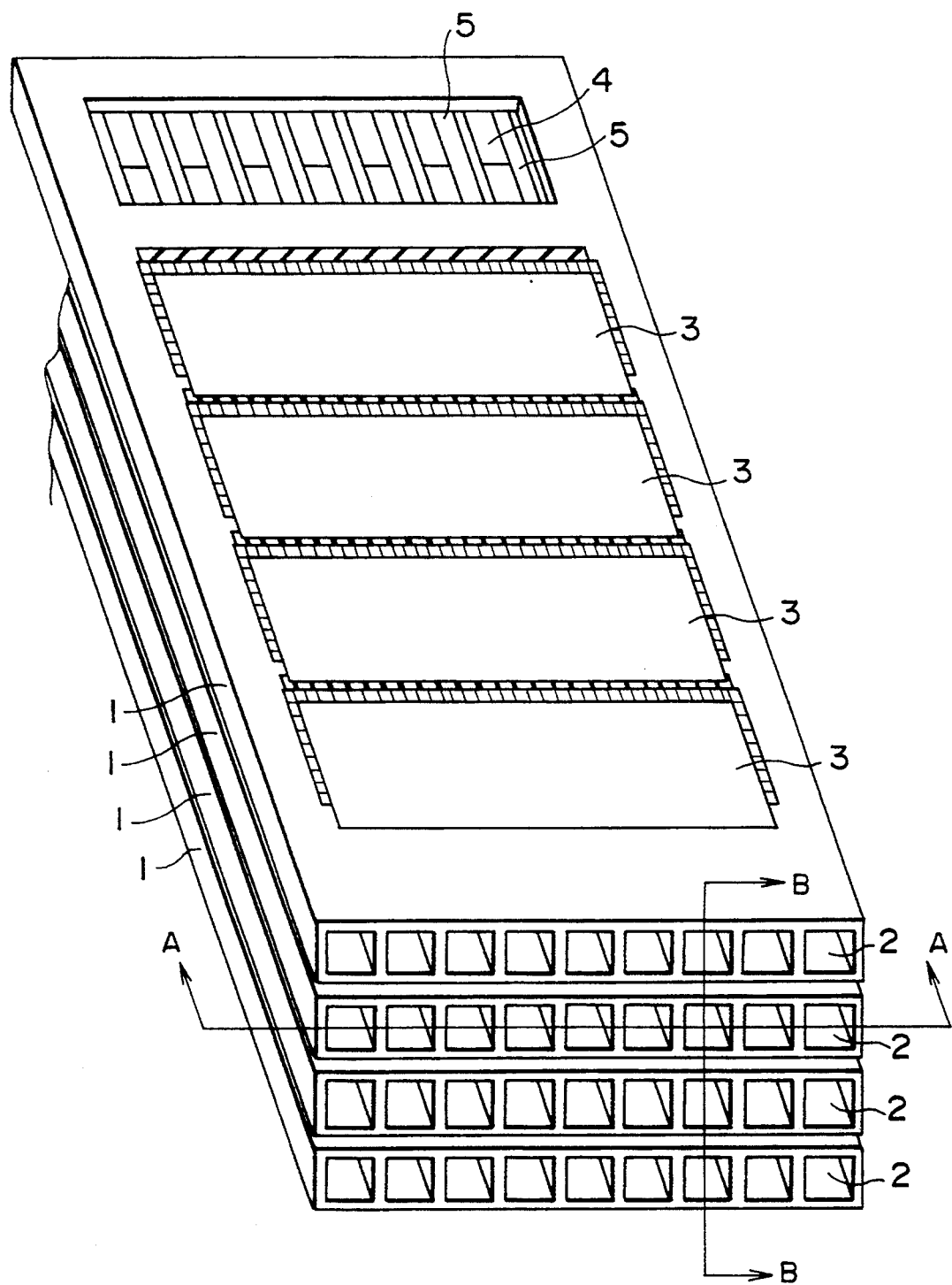
FIG. 6 is a partly sectioned schematic perspective view showing the solid oxide fuel cell generator of the present invention.

The basic structure of the solid oxide fuel cell generator according to the present invention is, as schematically shown in a partially sectioned perspective view of FIG. 6, comprises a substrate 1 having plural hollow parts 2, a plurality of fuel cell mounting holes 4 formed on the surface of the substrate 1 and a plurality of supports 5 provided within each of the holes 4.

Figure 1:
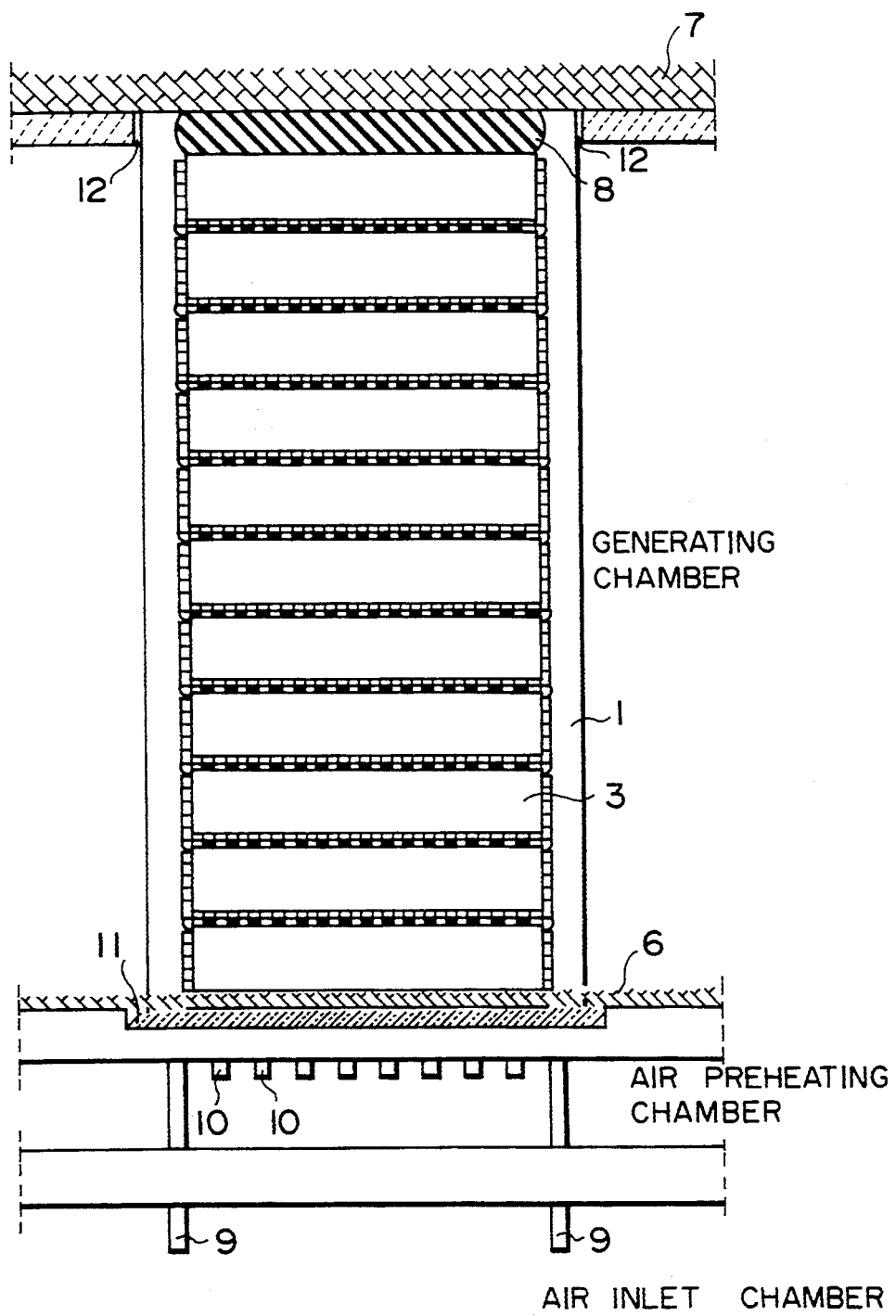
FIG. 1 is a plan view showing a solid oxide fuel cell generator according to the present invention.

FIG. 1 is a plan view of the solid oxide fuel cell generator according to the present invention. A stack having a plurality of cell sections 3, which are mounted on a dense substrate 1 closed at its upper end, is sealed with fused glass 11 at its lower end and air is introduced into the inside of the substrate 1 via air inlet tubes 9 at both sides of the substrate 1, while a fuel gas, such as hydrogen, is caused to flow on an outer side of the substrate 1 from an upper fuel inlet chamber via fuel inlet openings 12. The cell sections 3 are connected in series with one another and generated electricity is collected by an anode 6 of nickel felt and a cathode 7 of nickel felt provided at the lower ends of a generating chamber and the fuel inlet chamber, as viewed in FIG. 1, respectively.

Figure 2:
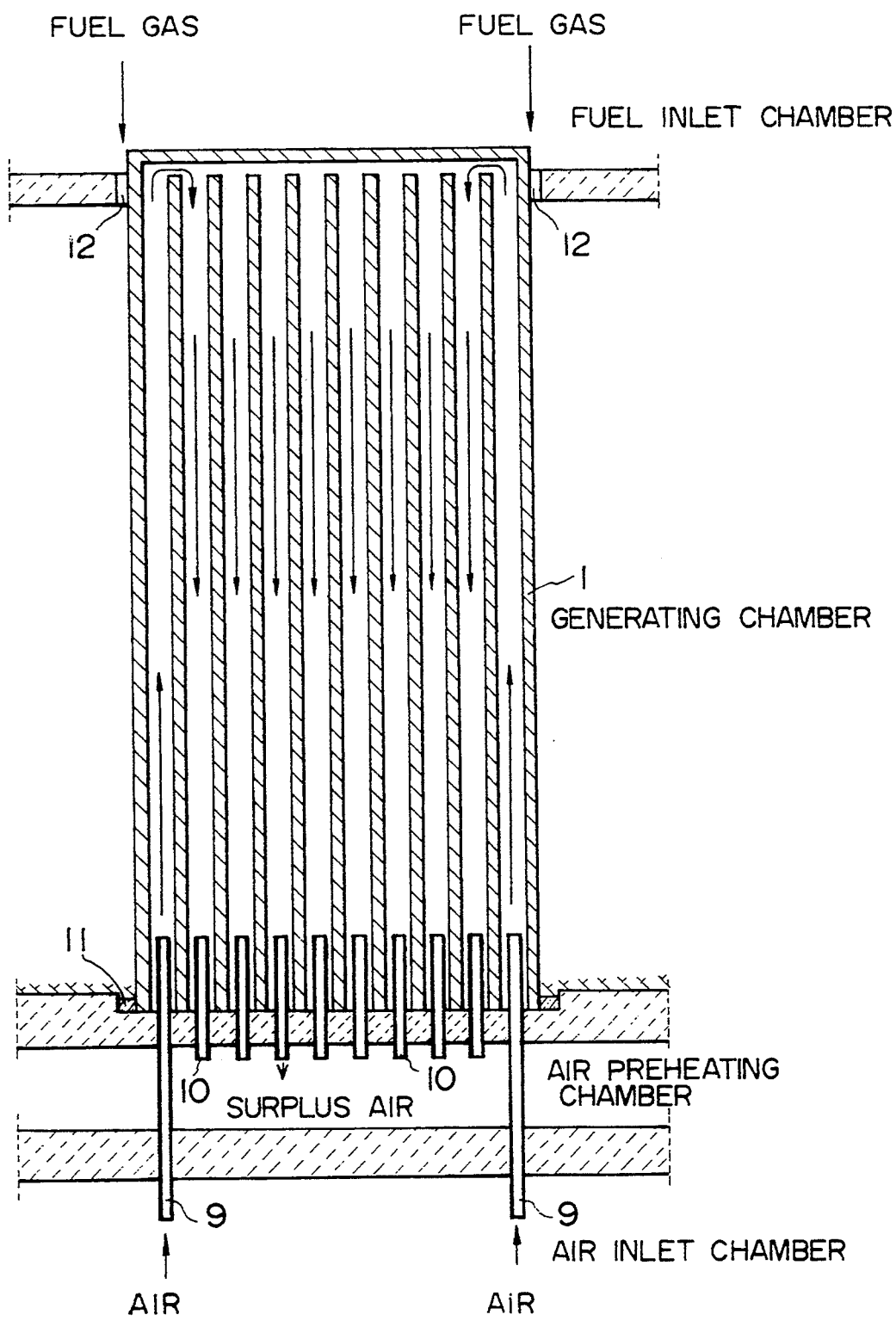
FIG. 2 is a cross-sectional view taken along line A—A of FIG. 6.

FIG. 2 is a cross-sectional view taken along line A—A of FIG. 6, that is, a cross-sectional view of the substrate 1 shown in FIG. 1. The cell section is not shown. Air supplied from the air inlet chamber is introduced via air inlet tubes 9 into both lateral sides of the substrate so that the air flows in hollow parts which are not contacted with the cell sections 3, with being preheated by heat transfer from the generation chamber, and, then, into an adjoining central flow channel.

The lateral sides of the substrate 1 are designed as a dead zone, that is, a zone free of the cell sections, for maintaining integrity of the dense substrate. This zone is used for preheating. Surplus air, which has passed through the central flow channel without being consumed, is discharged via air effluent tubes 10 into an air preheating chamber for further preheating the air inlet tubes 9. The air preheating effect may be further improved by introducing the spent fuel from the generating chamber into the air preheating chamber for combustion in the air preheating chamber.

Figure 3:
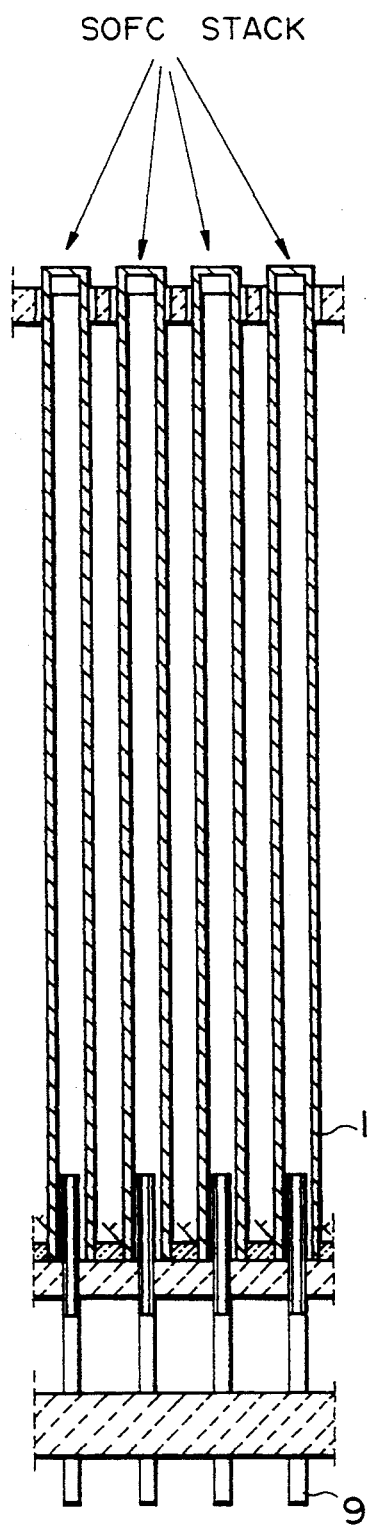
FIG. 3 is a cross-sectional view taken along line B—B of FIG. 6.

FIG. 3 is a cross-sectional view taken along line B—B of FIG. 6, that is, a cross-sectional view through a mid part of FIG. 1. The cell section is not shown. In this manner, a large number of stacks may be arranged as shown.

Figure 4:
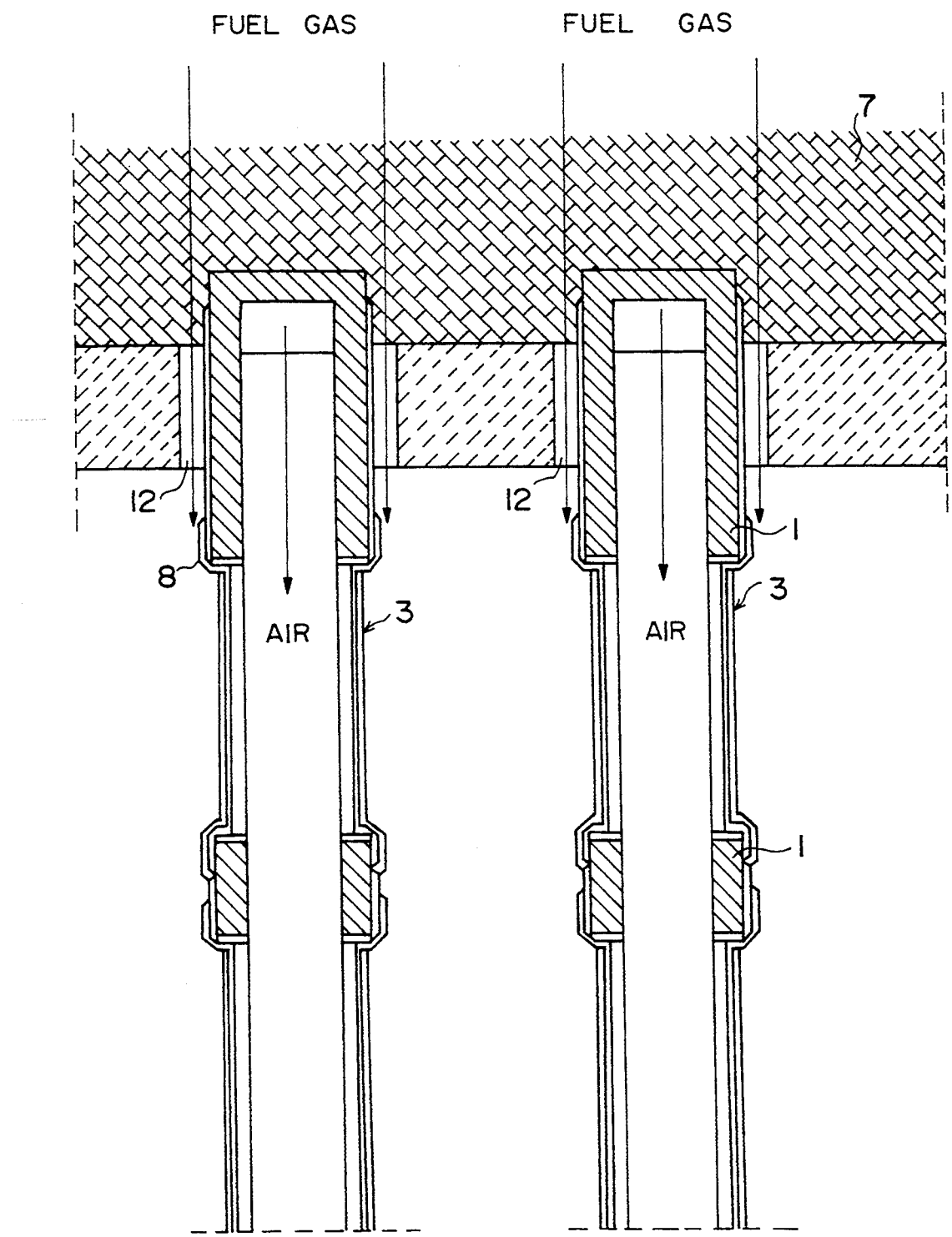
FIG. 4 is an enlarged view showing an upper part of FIG. 3.

FIG. 4 is an enlarged view showing an upper part of FIG. 3. Each of the stacks is supported by a partition wall between the fuel inlet chamber and the generating chamber, with the fuel gas being introduced into the generating chamber via an interstice provided in the partition wall. The nickel felt 7 is electrically connected with an air electrode formed at the topmost part of the cell section via an electrically conductive interconnection 8 and acts as a positive current-collecting terminal. If methane or the like is used as fuel, the nickel felt also act as a catalyst for the gas reforming. The partition wall is a guide wall for SOFC stacks and is not firmly contacted with these stacks. Therefore, the substrate is not subjected to destruction of the fixed part of the substrate and gas leakage at that part.

Figure 5:
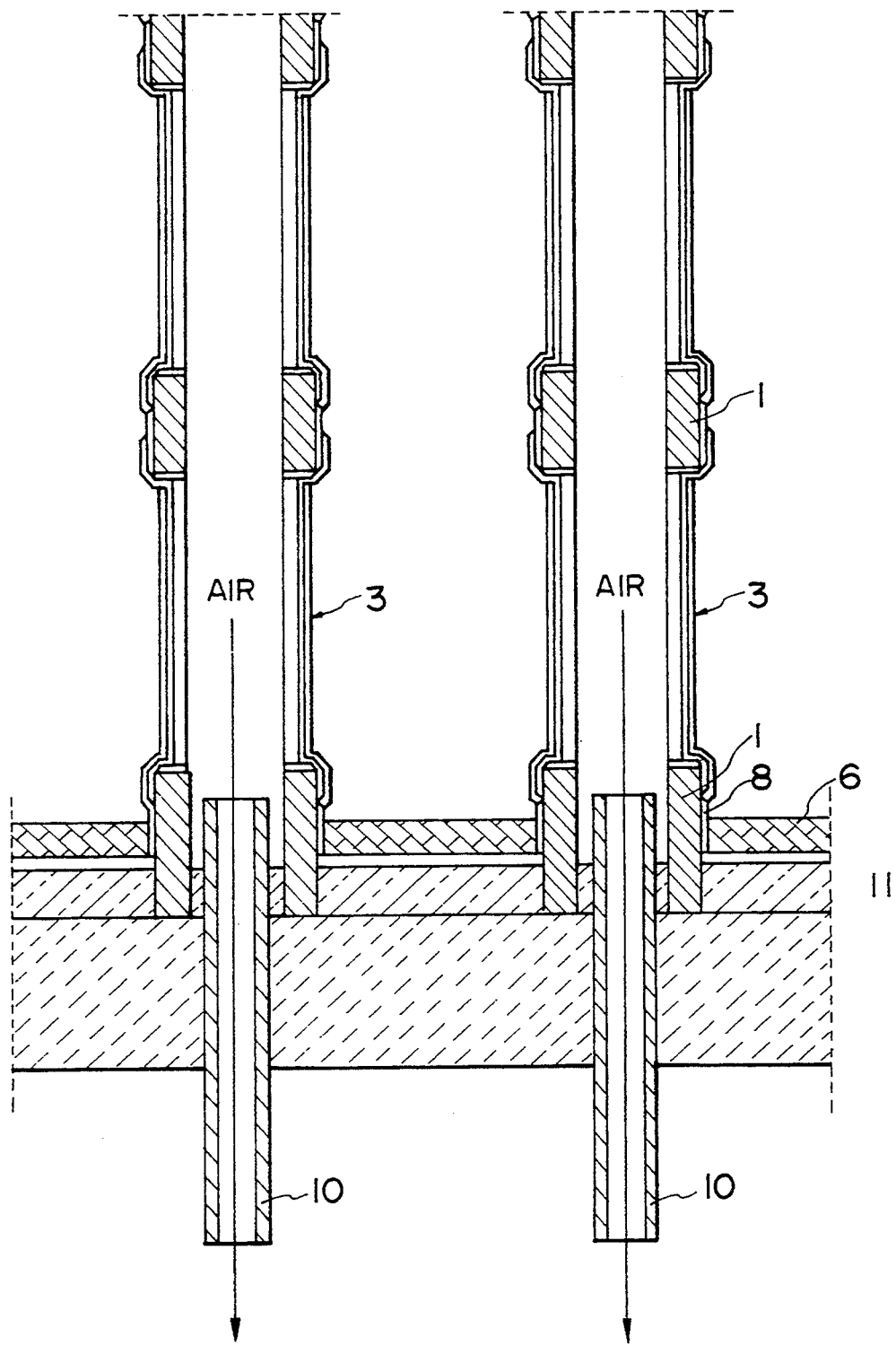
FIG. 5 is an enlarged view showing a lower part of FIG. 3.

FIG. 5 is an enlarged view showing the lower part of FIG. 3. The stacks are each immersed in the fused glass 11 by their own gravity for establishing a gas seal between the air and fuel gas on the inner and outer sides of the substrate. Air inlet and discharge into and out of the stacks is effected through tubes passing through partition walls between the air preheating chamber and the generating chamber and between the air preheating chamber and the air inlet chamber. The nickel felt 6 provided above the fused glass 11 as viewed in FIG. 5 is electrically connected with a fuel electrode formed at the lowest part of the cell via the electrically conductive interconnection 8 so as to play the part of a negative current-collecting terminal.

Figure 7:
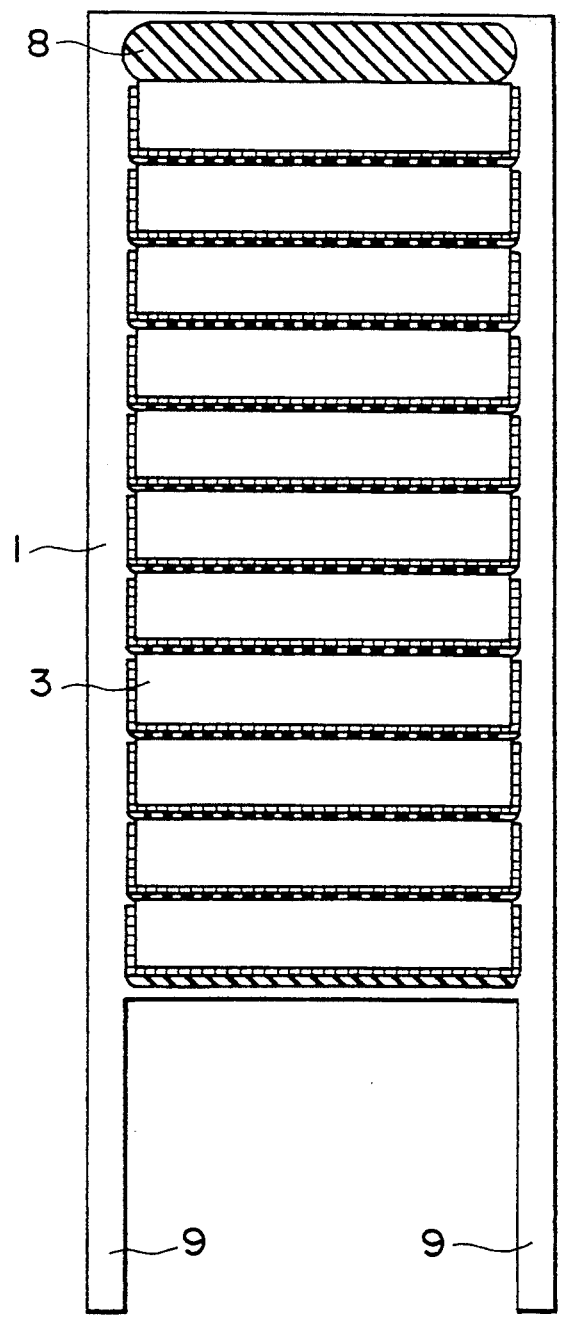
FIG. 7 is a plan view showing a modification of the solid oxide fuel cell generator according to the present invention.
Figure 8:
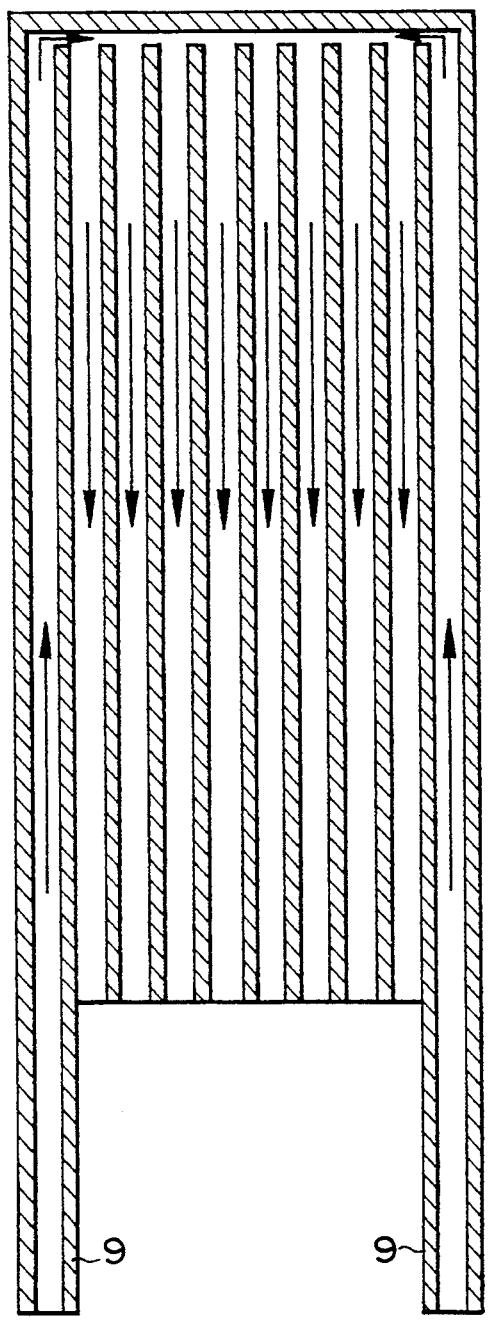
FIG. 8 is a sectional view of a substrate shown in FIG. 7.

FIG. 7 shows an modification in which the flow channels on both lateral sides of the substrate 1, not contacted with the cell sections 3 are extended to form air inlet tubes 9. The present modification is otherwise the same as the embodiment shown in FIGS. 1 and 2, although the common parts are not shown. FIG. 8 shows a transverse cross-section of the substrate 1 parallel to the substrate surface. The cell sections are not shown.

Figure 9:
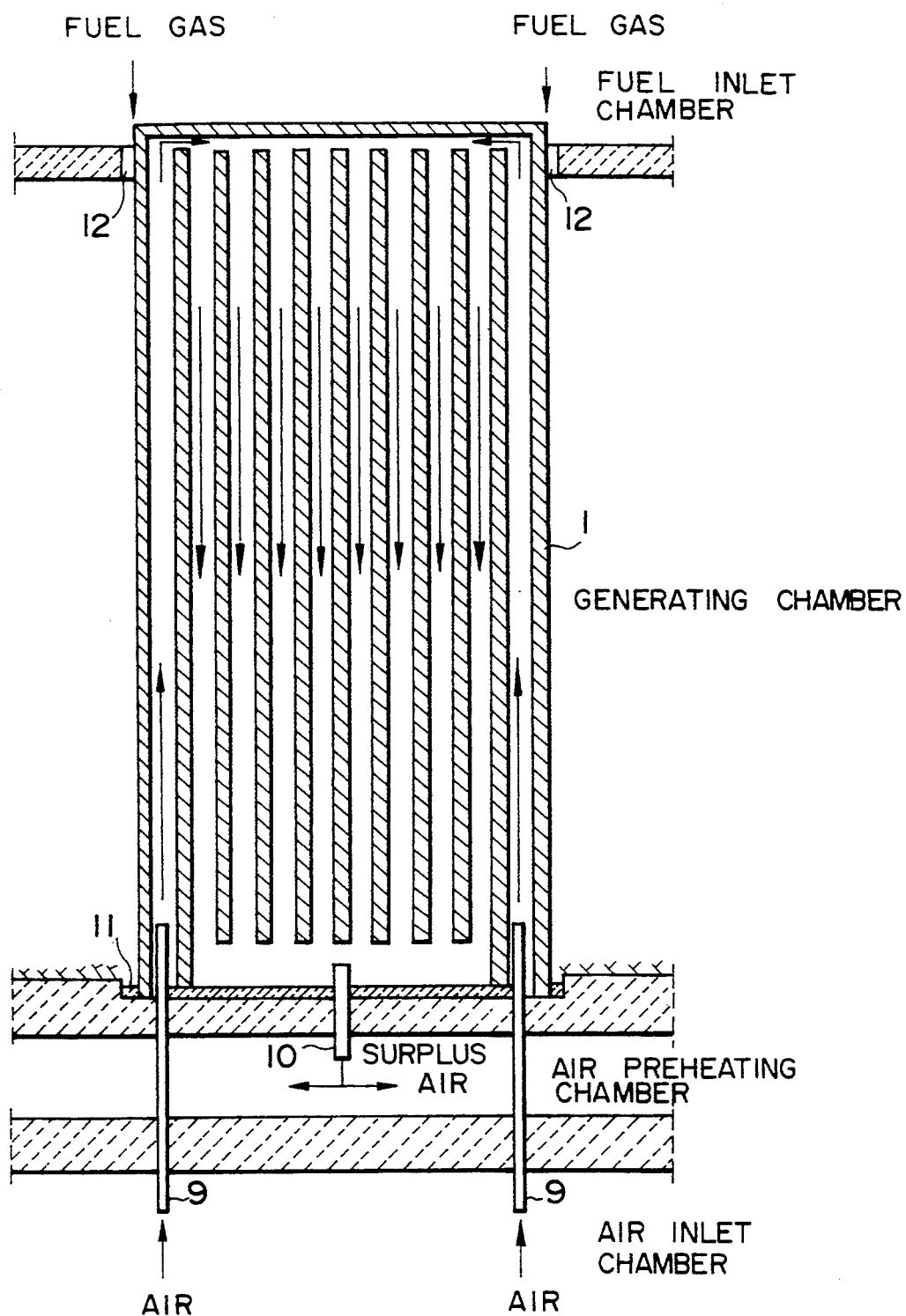
FIG. 9 is a sectional view of a substrate modified from that shown in FIG. 2.

FIG. 9 shows, in a cross section of the substrate 1, another modification of the present invention in which only the flow channel construction differs from that of the preceding embodiments. The cell sections again are not shown. With the present modification, the lower ends, as viewed in FIG. 9, of the central flow channels of the substrate are opened for communication with one another, and a sole air effluent tube 10 is provided in the communicating zone.

Figure 10:
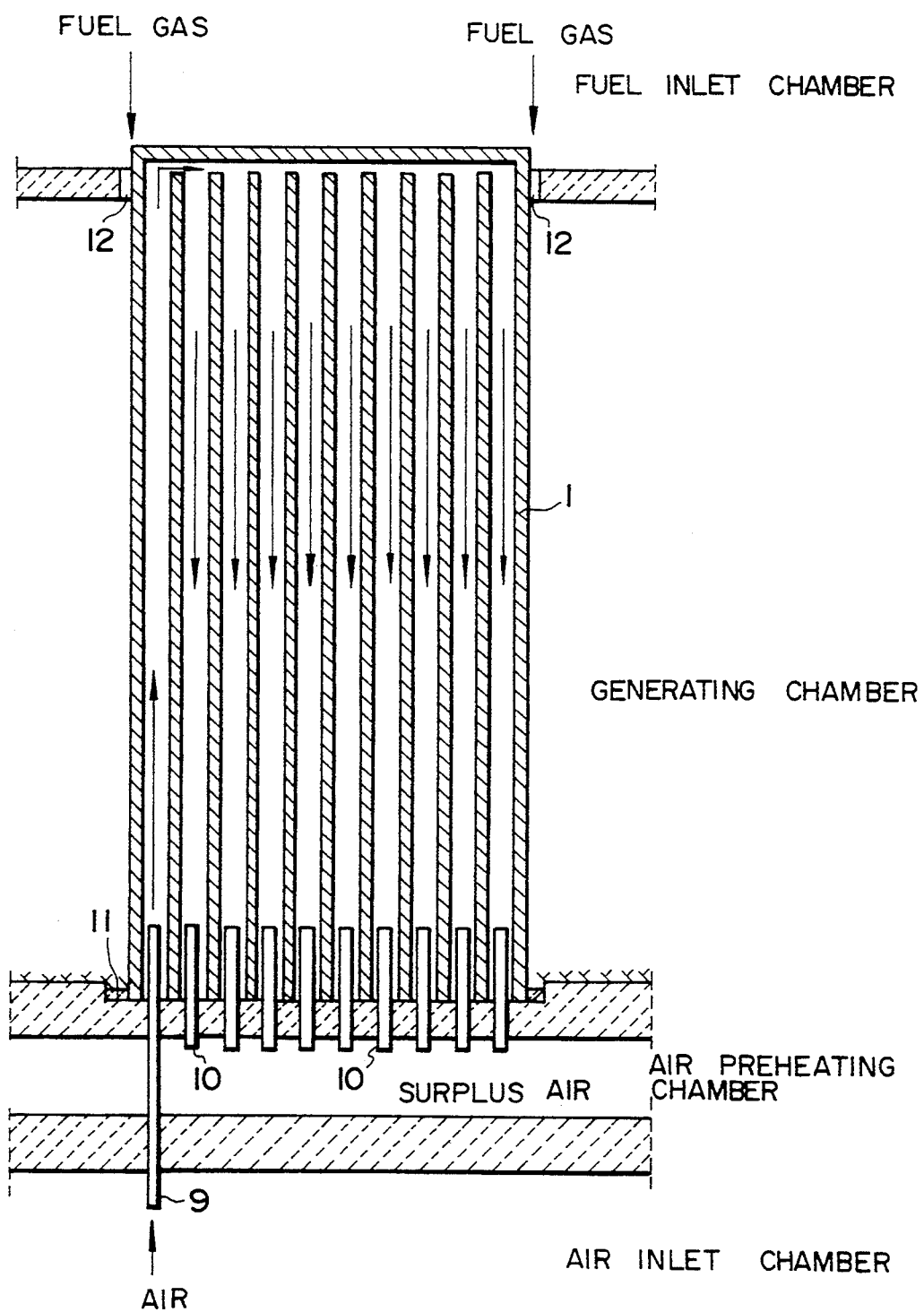
FIG. 10 is a sectional view of another substrate modified from that shown in FIG. 2.

FIG. 10 shows, by a transverse cross-section of the substrate 1, a further modification in which only one air inlet tube 9 is provided at a lateral side of the substrate 1. The cell section is not shown. The present modification is otherwise the same as in FIG. 2.

Figure 11:
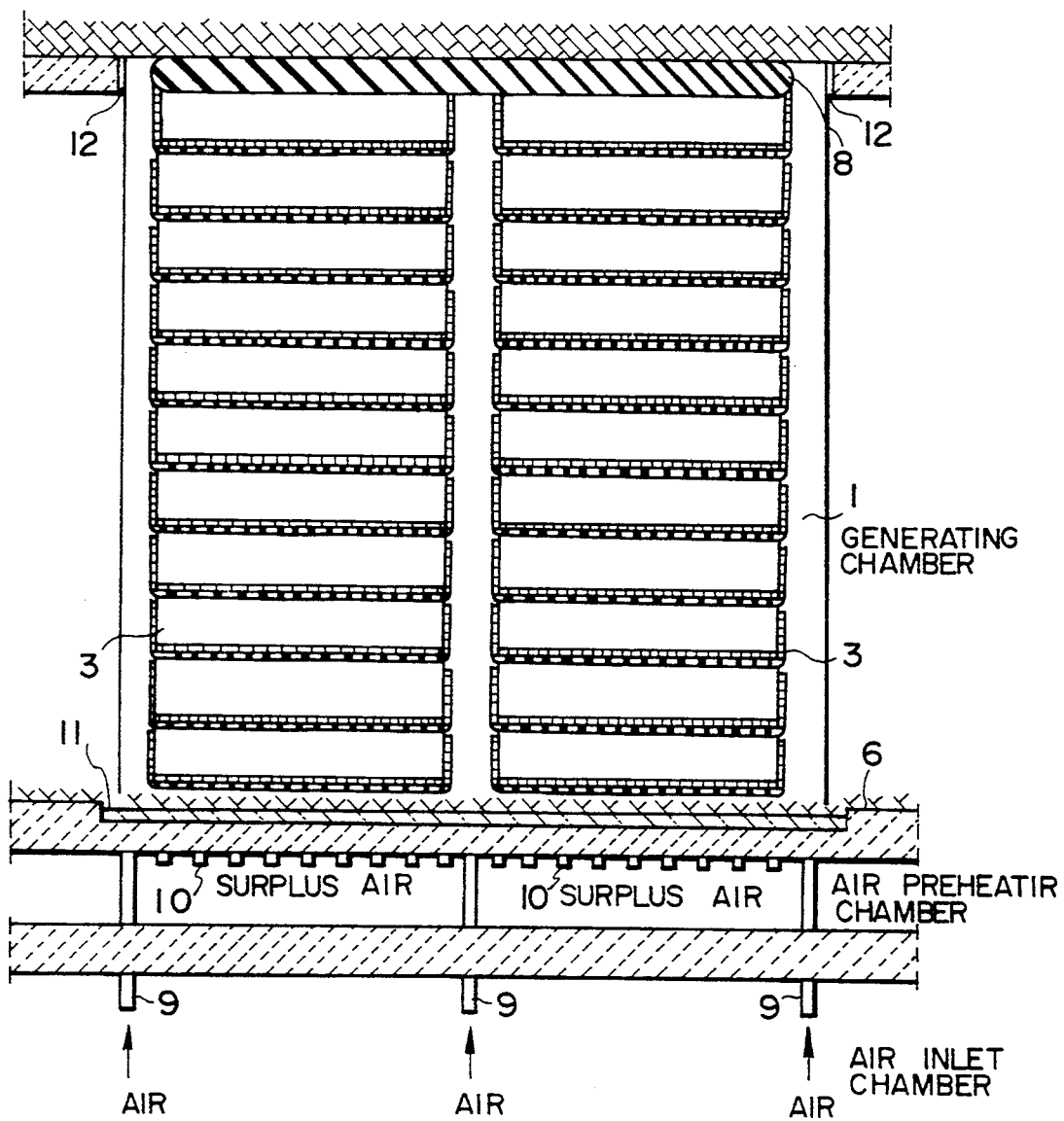
FIG. 11 is a plan view showing a further modification of the solid oxide fuel cell generator according to the present invention.
Figure 12:
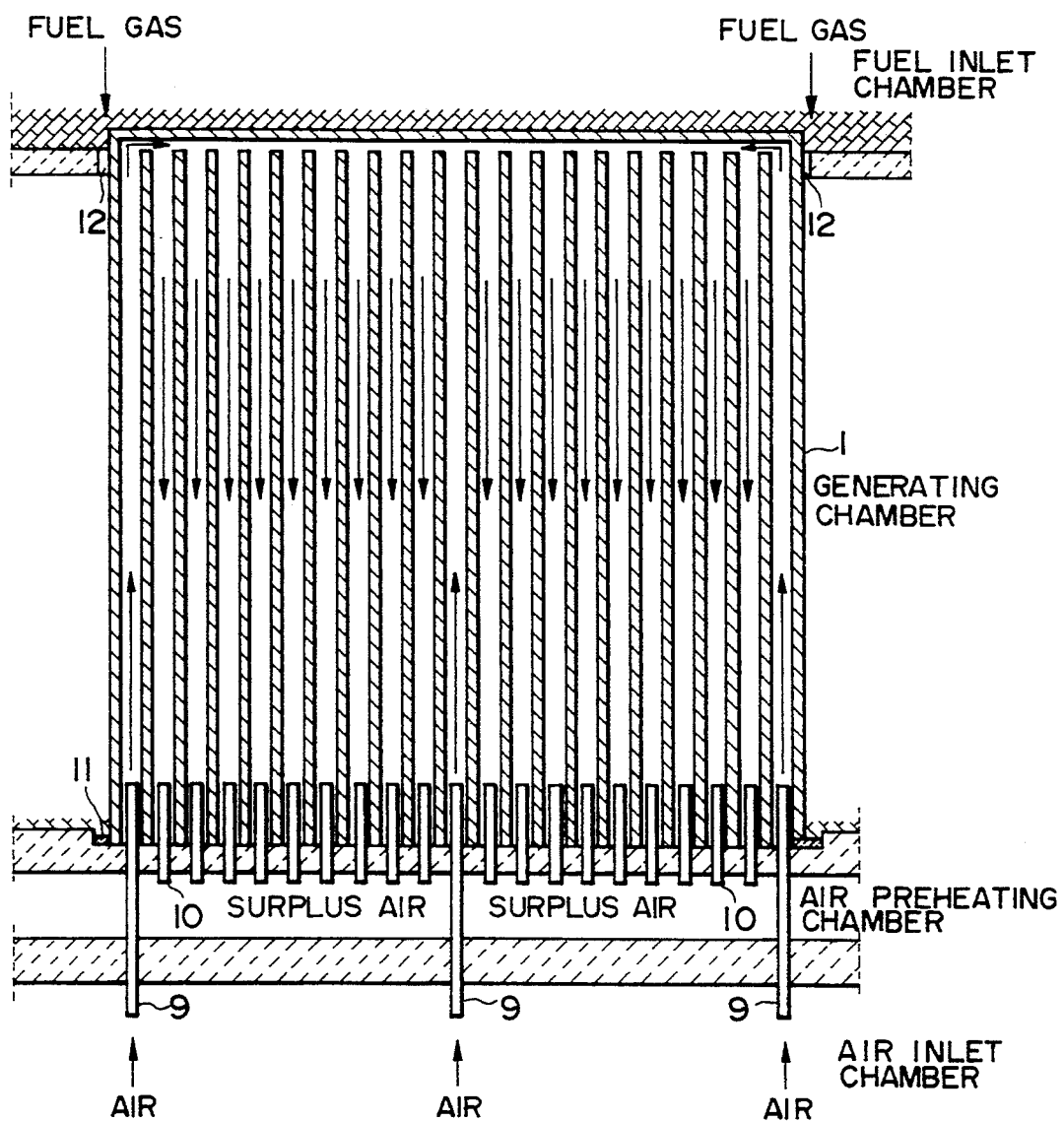
FIG. 12 is a sectional view of a substrate shown in FIG. 11.

In a further modification shown in FIG. 11, the cell sections 3 are arranged in two parallel groups on the substrate 1, and neighboring inner air inlet tubes of the groups are combined into one central air inlet tube. FIG. 12 shows the transverse cross-section of the substrate showing the flow channel structures. The cell sections again are not shown. The present modification is otherwise the same as the embodiment shown in FIG. 2.

FIG. 13 shows a still further modification in which the air inlet tubes 9 on both lateral sides of the substrate 1 in FIG. 12 are eliminated to leave only the central air inlet tube. In FIG. 13, the cell sections again are not shown. The substrate is shown with a reduced width. In the present modification, the cell sections are arranged in two groups on both sides of the central air inlet tube. The present modification is otherwise the same as that shown in FIG. 2.

It will be seen from above that the present invention provides a solid oxide fuel cell generator in which the substrate is formed of a dense structure which has hollow parts providing supply channels for supplying a fuel or fuel assistant gas to cell sections and, hence, a sufficiently preheated gas is supplied to the cell sections to improve the generating efficiency without requiring the use of an extra gas supplying means or the like. Further, since the supply channels are provided at the lateral sides of the substrate, the areal efficiency of the generating section is greatly improved and molding of the substrate can be easily made at a lower production cost. Furthermore, since the substrate is closed at its one end and is supported only at its lower end by its own weight, any difficulty in gas sealing is eliminated.

What is claimed is:

1. A solid oxide fuel cell generator comprising:

a substrate having a plurality of longitudinal hollow parts as gas flow channels, a closed end, and two lateral sides;

a plurality of cell mounting holes with supports therein formed on a surface of the substrate, the cell mounting holes being adjacent to the gas flow channels;

a plurality of cell sections residing on the cell mounting holes and the supports, adjacent cell sections being connected to each other by electrically conductive interconnections; and wherein at least one of the gas flow channels formed in the substrate adjacent to the cell mounting holes serves as a gas supply channel for supplying a fuel or a fuel assistant gas from a first end opposite to the closed end, the at least one gas flow channel communicates with other gas flow channels of the substrate under the plurality of cell sections at the closed end of the substrate, and the fuel or fuel assistant gas is preheated at an air preheating chamber at the first end or by heat transfer while flowing in the gas flow channels.

2. The solid oxide fuel cell generator according to claim 1, wherein the supply channel is in both lateral sides of the substrate.

* * * * *